(12) United States Patent
Martín Antolín et al.

(10) Patent No.: US 11,270,088 B2
(45) Date of Patent: Mar. 8, 2022

(54) CHIPLESS RFID TAG, A CHIPLESS RFID SYSTEM, AND A METHOD FOR ENCODING DATA ON A CHIPLESS RFID TAG

(71) Applicant: UNIVERSITAT AUTONOMA DE BARCELONA, Bellaterra (ES)

(72) Inventors: Juan Fernando Martín Antolín, Bellaterra (ES); Cristià Herrojo Prieto, Bellaterra (ES); Francisco Javier Mata Contreras, Barcelona (ES); Ferran Paredes Marco, Bellaterra (ES)

(73) Assignee: UNIVERSITAT AUTONOMA DE BARCELONA, Bellaterra (ES)

( * ) Notice: Subject to any disclaimer, the term of this patent is extended or adjusted under 35 U.S.C. 154(b) by 0 days.

(21) Appl. No.: 16/617,188

(22) PCT Filed: May 31, 2018

(86) PCT No.: PCT/EP2018/064332
§ 371 (c)(1),
(2) Date: Nov. 26, 2019

(87) PCT Pub. No.: WO2018/220109
PCT Pub. Date: Dec. 6, 2018

(65) Prior Publication Data
US 2021/0133403 A1    May 6, 2021

(30) Foreign Application Priority Data

Jun. 1, 2017 (EP) .................................. 17382326

(51) Int. Cl.
*G06K 7/10* (2006.01)
*G06K 19/077* (2006.01)

(52) U.S. Cl.
CPC ..... *G06K 7/10366* (2013.01); *G06K 19/0772* (2013.01)

(58) Field of Classification Search
CPC ............ G06K 7/00; G06K 7/08; G06K 7/081; G06K 9/00; G06K 19/00; G06K 19/04
(Continued)

(56) References Cited

U.S. PATENT DOCUMENTS

| | | | |
|---|---|---|---|
| 2009/0160654 A1* | 6/2009 | Yang .................... | B65D 1/0207 340/572.9 |
| 2012/0223142 A1* | 9/2012 | Wang ................... | H01Q 1/2216 235/462.25 |

(Continued)

FOREIGN PATENT DOCUMENTS

| | | |
|---|---|---|
| EP | 1811432 A1 | 7/2007 |
| WO | WO-2017017181 A1 | 2/2017 |

OTHER PUBLICATIONS

International Search Report and Written Opinion of the International Search Authority issued in PCT/EP2018/064332, dated Aug. 10, 2018; ISA/EP.

*Primary Examiner* — Edwyn Labaze
(74) *Attorney, Agent, or Firm* — Harness, Dickey & Pierce, P.L.C.

(57) ABSTRACT

The present invention relates to a chipless RFID tag (T), comprising: —a dielectric substrate (1); and —electromagnetic resonators (3) excitable by an external electromagnetic field and respectively arranged on separate spatial locations of the dielectric substrate (1) forming a row, and configured to resonate at a common resonant frequency. The dielectric substrate (1) defines several predetermined encoding areas that include the separate spatial locations, so that data is encoded by the presence/absence of operative electromagnetic resonators (3) thereon. The present invention also relates to a system comprising the chipless RFID tag of the invention and a RFID reader (R) reading an encoded code by detecting the presence/absence of attenuation peaks on an electromagnetic wave providing the external electromagnetic (Continued)

netic field to the electromagnetic resonators (3). The present invention also relates to a method for encoding data on a chipless RFID tag defined according to the present invention.

15 Claims, 3 Drawing Sheets

(58) Field of Classification Search
USPC .............................. 235/451, 435, 439, 492
See application file for complete search history.

(56) References Cited

U.S. PATENT DOCUMENTS

| | | | |
|---|---|---|---|
| 2014/0354414 A1* | 12/2014 | Karmakar | H03H 9/642 |
| | | | 340/10.3 |
| 2015/0076235 A1* | 3/2015 | Qian | G06K 19/0672 |
| | | | 235/492 |
| 2015/0199602 A1* | 7/2015 | van der Weide | G06K 7/10366 |
| | | | 340/10.1 |
| 2015/0235066 A1* | 8/2015 | Hattori | G06K 7/10128 |
| | | | 340/10.1 |
| 2016/0290944 A1* | 10/2016 | Potyrailo | H05K 1/16 |
| 2017/0116444 A1 | 4/2017 | Karmakar et al. | |
| 2018/0322319 A1* | 11/2018 | Gibson | G06K 7/10009 |

* cited by examiner

US 11,270,088 B2

CHIPLESS RFID TAG, A CHIPLESS RFID SYSTEM, AND A METHOD FOR ENCODING DATA ON A CHIPLESS RFID TAG

CROSS-REFERENCE TO RELATED APPLICATIONS

This application is a 371 U.S. National Stage of International Application No. PCT/EP2018/064332, filed on May 31, 2018, which claims priority to European Application No. 17382326.1, filed on Jun. 1, 2017. The entire disclosures of the above applications are incorporated herein by reference.

FIELD OF THE INVENTION

The present invention generally relates, in a first aspect, to a chipless RFID tag, comprising electromagnetic resonators arranged on a dielectric substrate, and more particularly to a chipless RFID tag providing a high number of bits for the code encoded therein.

A second aspect of the present invention relates to a system comprising a chipless RFID tag defined according to the first aspect of the present invention, and a RFID reader.

A third aspect of the present invention relates to a method for encoding data on a chipless RFID tag according to the first aspect of the invention.

BACKGROUND OF THE INVENTION

One of the drawbacks of radiofrequency identification (RFID) technology is the high cost of chip-based tags. Although such tags exhibit very high data capacity (due to the presence of the silicon integrated circuit-IC), in certain applications (e.g., identification and tracking of low-cost items) the price of chip-based tags is prohibitive. In other applications related to authentication and security, where counterfeiting, fraud and unauthorized copying of valuable documents are key issues, low-cost encoders fully integrated with the tagging items are required. Chipless RFID technology alleviates the previous cost requirements since tags are equipped with printed encoders replacing the silicon ICs. Such tags can be implemented in flexible substrates (e.g., LCP, paper, etc.). Alternatively, the printed encoders can be integrated with the tagging item as part of it, in order to provide unique ID signatures, of interest in authentication and security applications (banknotes, certificates, official and corporate documents, exams, ballots, etc.).

Chipless RFID tags can be categorized as time-domain [1]-[3] or frequency-domain based tags [4]-[6]. In time-domain chipless RFID tags, the code is determined from the echoes of a pulsed signal produced by a set of reflectors printed on a slow-wave transmission line. By contrast, a set of resonators, each one tuned to a different frequency and printed on a dielectric substrate, provides the so-called spectral signature in frequency-domain chipless tags. One limitation of this multi-resonator approach is the spectral bandwidth required to accommodate a significant number of bits. Strategies such as polarization diversity [7] or multi-state resonators (where up to four logic stages, i.e., two bits, per resonant element have been demonstrated) [8], [9] have been recently reported. Although a relatively high data density per frequency (DPF) and density per surface (DPS) is achieved by means of these approaches, it is not possible to implement tags with the required number of bits that many applications demand.

REFERENCES

[1] C. S. Hartmann, "A global SAW ID tag with large data capacity," in *Proc. of IEEE Ultrasonics Symposium,* October 2002, vol. 1, pp. 65-69.

[2] M. Schüßler, C. Damm, M. Maasch, and R. Jakoby, "Performance evaluation of left-handed delay lines for RFID backscatter applications," in Proc. of the *IEEE MTT-S International Microwave Symposium* 2008, pp. 177-180.

[3] F. J. Herraiz-Martinez, F. Paredes, G. Zamora, F. Martin, and J. Bonache, "Printed magnetoinductive-wave (MIW) delay lines for chipless RFID applications", *IEEE Trans. Ant. Propag.,* vol. 60, pp. 5075-5082, November 2012.

[4] S. Preradovic, I. Balbin, N. C. Karmakar, and G. F. Swiegers, "Multiresonator-based chipless RFID system for low-cost item tracking," *IEEE Trans. Microw. Theory Techn.,* vol. 57, pp. 1411-1419, 2009.

[5] S. Preradovic and N. C. Karmakar, "Design of chipless RFID tag for operation on flexible laminates," *IEEE Anten. Chipless Propag. Lett.,* vol. 9, pp. 207-210, 2010.

[6] S. Preradovic and N. C. Karmakar, *Multiresonator-based Chipless RFID: Barcode of the Future,* Springer, 2012.

[7] A. Vena, E. Perret, S. Tedjini, "A compact chipless RFID tag using polarization diversity for encoding and sensing", *2012 IEEE International Conference on RFID (RFID),* Orlando (FL), April. 2012.

[8] M. S. Bhuiyan, A.K.M Azad, N. Karmakar, "Dual-band modified complementary split ring resonator (MCSRR) based multi-resonator circuit for chipless RFID tag", 2013 *IEEE Eight International Conference on Intelligent Sensors, Sensor Networks and Information Processing, Melbourne,* VIC, April 2013, pp. 277-281.

[9] C. Herrojo, J. Naqui, F. Paredes, F. Martin, "Spectral signature barcodes implemented by multi-state multi-resonator circuits for chipless RFID tags", *IEEE MTT-S International Microwave Symposium* (IMS'16), San Francisco, May 2016.

DESCRIPTION OF THE INVENTION

It is an object of the present invention to offer an alternative to the prior state of the art, with the purpose of providing a chipless RFID tag and chipless RFID system which covers the gaps found in the prior art, particularly overcoming the limitations regarding the number of code bits from which the prior art proposals suffer.

To that end, the present invention relates, in a first aspect, to a chipless RFID tag, comprising, in known manner:

a dielectric substrate; and electromagnetic resonators excitable by an external electromagnetic field and respectively arranged (generally etched or printed) on separate spatial locations of said dielectric substrate.

In contrast to the chipless RFID tags known in the prior art, in the chipless RFID tag of the first aspect of the present invention, the electromagnetic resonators are arranged on the dielectric substrate forming at least one row, and are configured to resonate at a common resonant frequency, and the dielectric substrate defines several predetermined encoding areas that include at least the above mentioned separate spatial locations, so that data is encoded by the presence/absence of operative electromagnetic resonators on each of said predetermined encoding areas.

An operative electromagnetic resonator is understood in the present document as that which resonates at said common resonant frequency when excited by an external electromagnetic field. Therefore, the presence of such an operative electromagnetic resonator in one of said separate spatial locations, and hence in an encoding area, provides the logic state "1" to that encoding area.

On the other hand, in the present document the expression absence of operative electromagnetic resonator refers to any of the following alternative cases: the absence of an electromagnetic resonator and the presence of an inoperative electromagnetic resonator, i.e. that which does not resonate when excited by an external electromagnetic field at said common resonance frequency. Therefore, an encoding area is provided with the logic state "0" when including such an inoperative electromagnetic resonator or when not including any electromagnetic resonator at all.

At least one code is thus provided by a set of the above mentioned encoding areas, each encoding area generally providing a bit of that code.

Since the spectral bandwidth of the chipless RFID tag of the first aspect of the present invention is virtually null, the achievable number of bits is merely limited by the area occupied by the code, i.e. by the region encompassing all the encoding areas.

Preferably, the above mentioned common resonant frequency is the fundamental resonance frequency of each of the electromagnetic resonators.

Alternatively, for a less preferred embodiment, the common resonant frequency is a harmonic frequency of each of the electromagnetic resonators.

For an embodiment, all of the electromagnetic resonators have substantially the same dimensions, geometry, and composition, and are preferably identical in every way.

According to an embodiment, the above mentioned predetermined encoding areas are equidistant to each other, and the at least one row is a linear or circular row running along at least one surface of the dielectric substrate. Other curved rows which follow a non-circular path (for example, an elliptical path) are also embraced by the present invention.

For a preferred embodiment of the chipless RFID tag of the first aspect of the invention, the electromagnetic resonators are planar electromagnetic resonators that can be excited by means of the above mentioned external electromagnetic field.

For a variant of said preferred embodiment, the planar electromagnetic resonators are split ring resonators (SRR) having one or more slits, single loop (preferably) or with more than one loop, or complementary split ring resonators (CSRR) (also with one or more slits and one or more loops), or S-shaped split ring resonators, or spiral resonators, or open-loop resonators, or any planar resonator that can be excited by an external electromagnetic field.

According to an embodiment, the dielectric substrate is a flexible substrate, including plastic substrates and paper substrates, such as a sheet of paper, a flexible LCP (Liquid Crystal Polymer), etc. Other flexible substrates which are not plastic or paper substrates are also covered by the present invention.

A second aspect of the present invention relates to a chipless RFID system, comprising:
  a chipless RFID tag defined according to the first aspect of the present invention; and
  a RFID reader comprising:
    a dielectric support relatively movable with respect to the dielectric substrate of the chipless RFID tag;
    at least one element for at least propagating an electromagnetic wave providing said external electromagnetic field to the electromagnetic resonators, said at least one element being arranged on the dielectric support to move therewith during said relative movement to adjacent locations to said predetermined encoding areas, such that the at least one element is loaded with the electromagnetic resonators of the predetermined encoding areas; and
    detection means configured and arranged for detecting the presence/absence of attenuation peaks on said electromagnetic wave, or on an electrical signal associated thereto, induced by the electromagnetic resonators, and also configured for providing, based on said detections, the data encoded in the chipless RFID tag, in the form of a code having at least one bit per predetermined encoding area, and at least two possible alternate logic states per bit determined by the presence/absence of a respective of said attenuation peaks.

For a preferred embodiment, the at least one element is arranged on the dielectric support to sequentially move along said adjacent locations during said relative movement, such that the at least one element is sequentially loaded along time with the electromagnetic resonators of the predetermined encoding area adjacent thereto at at least some of the adjacent locations. This sequential bit reading alleviates the spectral bandwidth limitations of previous multi-resonator chipless RFID tags.

For an implementation of said preferred embodiment, the RFID reader comprises a guide for guiding the dielectric substrate with respect to the dielectric support during the above mentioned sequential relative movement along said adjacent locations, so that for each adjacent position the corresponding encoding area is distanced from the at least one element below a certain distance (generally of a few millimetres or of below 1 mm) that guarantees near-field electromagnetic coupling.

Generally, the at least one element is a transmission line electrically fed through an input port and generating the above mentioned electrical signal at an output port, and the detection means are connected to the output port of the transmission line for detecting the generated electrical signal and the presence/absence of attenuation peaks thereon.

Preferably, the transmission line is a coplanar waveguide (CPW) having a central conductor strip and two return conductors, one to either side of the central conductor strip, and separated therefrom by respective slots, wherein the electromagnetic resonators are arranged such that during the relative movement of the dielectric support and dielectric substrate they pass transversally to the transmission line, in a parallel plane, causing attenuation peaks in the electrical signal when any of the electromagnetic resonators, or a portion thereof, is aligned with any of the slots.

An example of the above mentioned case where an attenuation peak in the electrical signal is caused when a portion of the electromagnetic resonators is aligned with any of the slots, is where the electromagnetic resonators is a S-SRR, i.e. a S-shaped SRR, so that upper and lower loops of the S-SRR constitute two respective of said portions sized so that each is aligned with a respective one of the slots of the CPW.

For alternative embodiments, the at least one element is another type of transmission line or waveguide or part of a receiving unit of a wireless link. Other electromagnetic propagation means can also be used to constitute the at least one element, for other embodiments.

For an embodiment, the electromagnetic resonators are separated from each other enough not to cause either inter-resonator coupling nor undesired simultaneous coupling between the at least one element and several electromagnetic resonators. For said embodiment, the system of the second aspect of the invention comprises a power source configured to generate and feed the at least one element with a harmonic signal tuned at the above mentioned common resonance frequency However, a problem arises when, in order to optimize the area occupied by the electromagnetic resonators, it is necessary to minimize its separation as much as possible. This causes the above mentioned inter-resonator coupling and simultaneous coupling between the at least one element and several electromagnetic resonators, consequently appearing multiple transmission zeros located at positions difficult to predict a priori.

To solve that problem, for a preferred embodiment, the system of the second aspect of the invention further comprises at least one additional electromagnetic resonator arranged on a second face of the dielectric support, opposite to a first face on which the at least one element is arranged, configured and arranged for avoiding inter-resonator coupling between the electromagnetic resonators of the dielectric substrate.

The additional electromagnetic resonator has substantially the same dimensions, geometry, and composition (and is ideally identical to) as each of the electromagnetic resonators arranged on the dielectric substrate but oriented at 180° with respect thereto, and is arranged to be alternatively aligned with each of the electromagnetic resonators of the encoding areas when the at least one element is at the corresponding adjacent location, to provide a broadside-coupled resonators structure formed by the resulting pair of the so aligned electromagnetic resonator and additional electromagnetic resonator, said broadside-coupled resonators structure being associated to a target resonance frequency.

For said preferred embodiment, the system of the second aspect of the invention comprises a power source configured to generate and feed the at least one element with a harmonic signal tuned at said target resonance frequency.

For another embodiment, the transmission line is a microstrip line loaded with a resonant element identical to the electromagnetic resonators of the chipless RFID tag, and configured as a bandpass structure, so that each time the electromagnetic resonators of the chipless RFID tag cross the microstrip line, detuning in the response is achieved, resulting in attenuation peaks in an electrical harmonic signal used to feed the microstrip line.

A third aspect of the invention relates to a method for encoding data on a chipless RFID tag according to the first aspect of the invention, wherein in the chipless RFID tag the electromagnetic resonators are present in all the encoding areas, preferably at equidistant spatial locations, and the method comprises encoding data by physically altering some of the electromagnetic resonators to make them inoperative, said physical alteration being performed, generally, by short-circuiting or cutting the electromagnetic resonators, thus providing the logic state '0' to the corresponding so made inoperative electromagnetic resonator.

A system for encoding data adapted to implement the method of the third aspect of the invention is also provided by another aspect of the present invention, the system comprising means for causing the above mentioned physical alteration to the electromagnetic resonators, such as an ink printer to supply conductive ink through a nozzle on an electromagnetic resonator to short-circuit the same, or a laser system to laser cut an electromagnetic resonator.

BRIEF DESCRIPTION OF THE DRAWINGS

The previous and other advantages and features will be better understood from the following detailed description of embodiments, with reference to the attached drawings, which must be considered in an illustrative and non-limiting manner, in which.

DETAILED DESCRIPTION OF SEVERAL EMBODIMENTS

Figure 1:
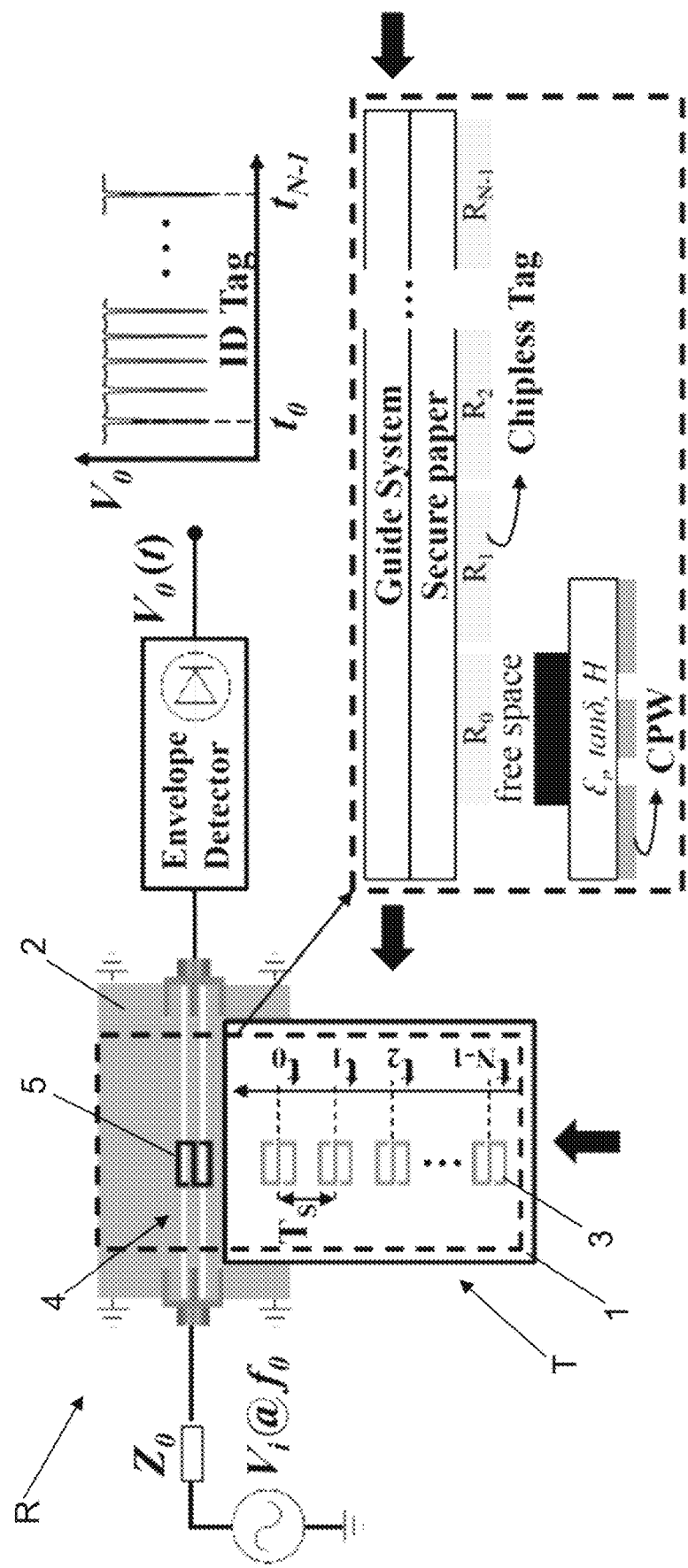
FIG. 1 schematically shows the chipless RFID system of the second aspect of the invention, for an embodiment, and also the working principle thereof. The cross sectional view is depicted in the inset. The black arrows indicate tag motion in a reading operation.

FIG. 1 shows an embodiment of the system of the second aspect of the invention, which comprises:

a chipless RFID tag T, comprising:

a dielectric substrate 1 (in this case, a secure paper); and electromagnetic resonators 3 (also identified in the Fig. as $R_0$ to $R_{N-1}$) excitable by an external electromagnetic field, respectively arranged on separate spatial locations of the dielectric substrate 1 each corresponding (for the illustrated embodiment) to a respective predetermined encoding area (of a plurality of equidistant predetermined encoding areas) of the tag T, and configured to resonate at a common resonant frequency;

a RFID reader R comprising:

a dielectric support 2 relatively movable with respect to the dielectric substrate 1 of the chipless RFID tag T, according to a sequential relative movement;

an element 4 for propagating an electromagnetic wave providing said external electromagnetic field to the electromagnetic resonators 3, the element 4 being arranged on the dielectric support 2 to move therewith during said sequential relative movement to adjacent locations to the predetermined encoding areas, such that the element 4 is sequentially loaded along time ($t_0$ to $t_{N-1}$) with the electromagnetic resonators 3 of the predetermined encoding areas adjacent thereto; and detection means configured and arranged for detecting the presence/absence of attenuation peaks on said electromagnetic wave, or on an electrical signal associated thereto, induced by the electromagnetic resonators 3, and also configured for providing, based on said detections, the data encoded in the chipless RFID tag T, in the form of a code having at least one bit per predetermined encoding area, and at least two possible alternate logic states per bit determined by the presence/absence of a respective of said attenuation peaks.

For the embodiment illustrated in FIG. 1, each separate spatial location corresponds to a respective predetermined encoding area, but for other embodiments for which the encoded code includes one or more logic states "0" defined by the absence of a resonator 3, the encoding area(s) defining said logic state "0" includes none of said separate spatial locations.

For the embodiment illustrated in FIG. 1, element 4 is a transmission line, particularly a CPW, electrically fed through an input port P1 and generating the above mentioned electrical signal at an output port P2, and the detection means comprise an envelope detector connected to the output port P2 of the CPW for detecting the generated electrical signal and the presence/absence of attenuation peaks thereon.

Figure 2:
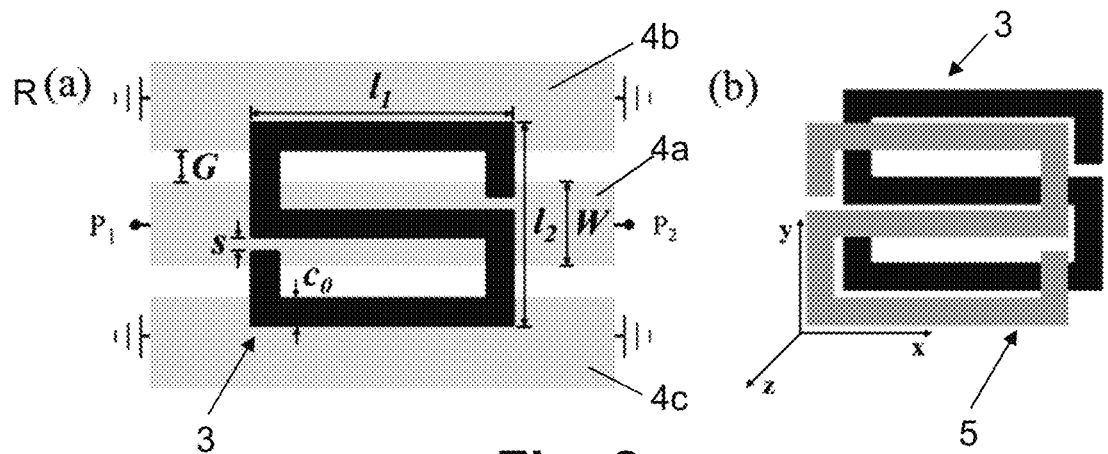
FIG. 2 shows a square S-shaped SRR coupled to a CPW transmission line (a) and a 3D view of the broadside coupled S-SRR (BC-S-SRR) (b).

As shown in FIG. 2(a), the CPW 4 has a central conductor strip 4a and two return conductors 4b, 4c, one to either side of the central conductor strip 4a, and separated therefrom by respective slots, and the electromagnetic resonators 3 are S-SRRs, for the illustrated embodiment, arranged such that during the relative movement they pass transversally to the transmission line 4, in a parallel plane, causing attenuation peaks in the electrical signal when any of the electromagnetic resonators 3 is aligned with said slots, particularly, for the illustrated embodiment, when an upper loop of the S of the S-SRR is aligned with the upper slot and a lower loop of the S is aligned with the lower slot.

In the following, the working principle for the present invention, and the implementation of a prototype of the system of the second aspect of the invention and measurements made thereon will be described.

Working Principle of the Proposed Chipless RFID System:

Reading of the proposed chipless RFID tags is based on electromagnetic coupling between the tag T and the reader R, a coplanar waveguide (CPW) transmission line fed by a harmonic signal tuned at the resonance frequency of the set of resonators. Note that with the proposed approach, the reading distance is preferably limited to the sub-millimeter scale in order to guarantee line-to-resonator coupling. Different to previous multi-resonator/transmission-line based chipless tags, where the resonant elements and transmission line are etched or printed on the same substrate and communication with the reader is achieved by means of cross polarized antennas (which are essential part of the tag, as well), according to the present invention tag reading is performed by near-field coupling.

As depicted in FIG. 1, in a reading operation the tag T must be forced to transversally move above the transmission line 4 in close proximity to it, so that electromagnetic coupling between the line 4 and the resonators 3 is possible. Each time a resonator 3 lies on top of the line 4, the coupling prevents signal to be transmitted through the line 4, effectively modulating the injected harmonic signal. Thus, the ID signature is obtained by reading the amplitude of the envelope (output) signal, inferred from an envelope detector. The required proximity between the reader R (specifically, transmission line 4) and the tag T (specifically, set of resonators 3) is not necessarily an issue in certain applications such as those indicated earlier (authentication and security). The main advantage of the present invention is that associated to the fact that the number of bits is not limited by bandwidth constraints, as occurs in multi-resonator based chipless tags. Indeed, in applications such as secure paper (e.g., to avoid counterfeiting or copying of corporate or official documents), it is potentially possible to print the tag resonators along one of the edges, opening the path to the design of chipless RFID tags with unprecedented data capacity.

Figure 3:
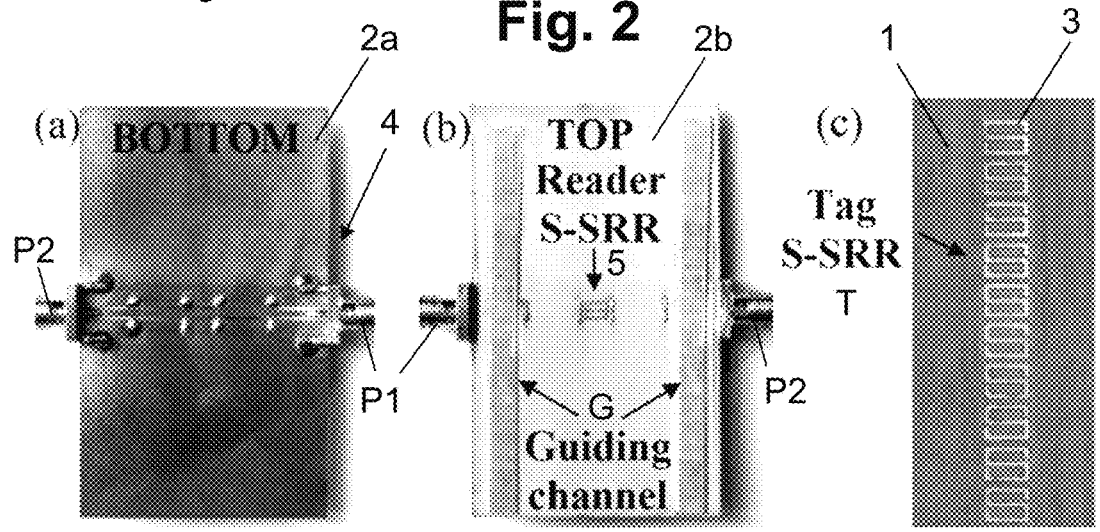
FIG. 3 shows a working prototype of the chipless RFID reader of the system of the second aspect of the invention, for an embodiment, particularly a transmission line reader, including the CPW (a) and a S-SRR (b), and a photograph of the fabricated encoder (c), i.e. of the chipless RFID tag formed by a plurality of S-SRRs. CPW dimensions, in ref. to FIG. 2(a), are (in mm) W=1.2 and G=0.48; S-SRR dimensions are (in mm) $l_1$=3.8, $l_2$=2.96, $C_0$=0.4 and s=0.2.

Tag and Reader Design, Fabrication and Characterization:

In order to prove the present invention works and provides the above asserted advantages, the present inventors have developed a proof-of-concept working prototype, which is illustrated in FIG. 3.

The prototype implements encoders, i.e. chipless RFID tags T (shown in FIG. 3(c)) on a Rogers RO4003C substrate 1 with thickness h=203 μm and dielectric constant $\varepsilon_r$=3.55, through a drilling machine. The resonant elements 3 are square S-shaped split ring resonators (S-SRRs), formerly used in [9] for the implementation of multi-resonator chipless tags. Such resonant elements [see the typical topology in FIG. 2(a)] are electrically small and can be properly excited by the counter magnetic field lines generated in the slots of the CPW 4 of the reader R when such particles are aligned and oriented as depicted in FIG. 2(a).

In order to optimize the area occupied by the S-SRRs, it is necessary to minimize its separation as much as possible. This results in inter-resonator coupling and simultaneous coupling between the line and several S-SRRs, consequently appearing multiple transmission zeros located at positions difficult to predict a priori. To solve this problem, an identical S-SRR 5 has been etched in the back substrate side of the CPW transmission line, but oppositely oriented [see FIG. 2(b)]. By this means, the resonance frequency of the structure that results when the S-SRR 5 of the line 4 and one of the S-SRRs SRRs 3 of the tag chain are just one on top of the other (giving rise to the broad-side coupled S-SRR, BC-S-SRR), is significantly smaller, thereby preventing coupling with the neighbor S-SRRs 3. This means that the frequency of the harmonic feeding signal must be actually tuned to the frequency of the BC-S-SRR.

The CPW transmission line 4 and the S-SRR 5 of the reader R have been etched on opposite sides 2a, 2b of a Rogers RO3010 substrate 2 (previously called dielectric support) with thickness h=635 μm and dielectric constant $\varepsilon_r$=10.2. The bottom and top photographs of this line (a 50 Ω line) are depicted in FIGS. 3(a) and (b). Such Fig. includes the photograph of a 10-bit tag T [FIG. 3(c)] with all the resonators 3 present and operative (i.e., all states corresponding to the logic '1').

To characterize such tag-reader system, a guiding channel G has been made in the top side 2b of the CPW 4, as shown in FIG. 3(b). Moreover, the tag T shown in FIG. 3(c), including substrate 1 and resonators 3, has been attached to a rigid substrate (with thickness h=1.6 mm and dielectric constant $\varepsilon_r$=4.7) for mechanical stability. Said rigid substrate is not seen in FIG. 3(c) because it remains under substrate 1 and is thus hidden by the same.

Figure 4:
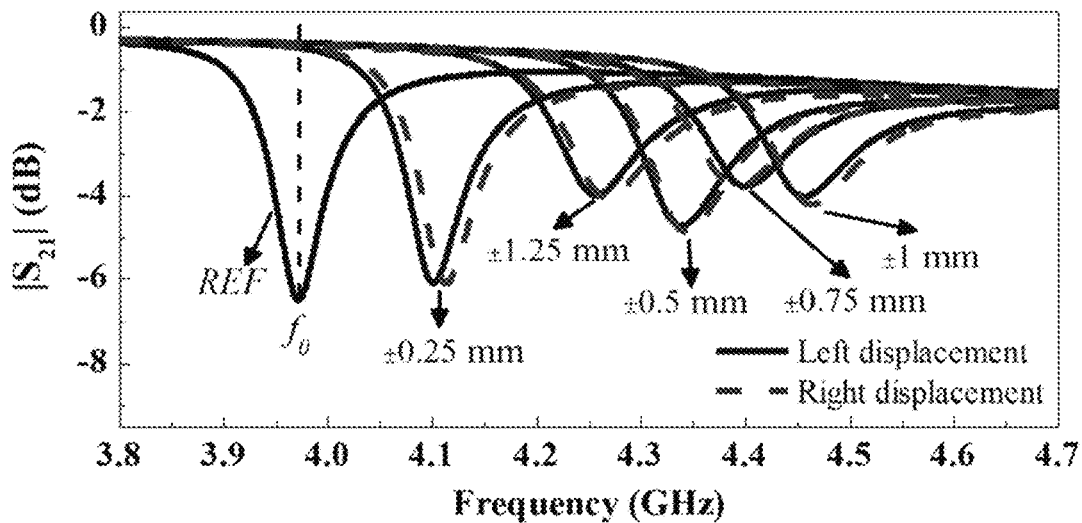
FIG. 4 is a plot which shows the measured frequency response of the tag-CPW of FIG. 3, for different relative positions of the tag in the vicinity of the reference position.

FIG. 4 depicts the measured frequency response for different positions of the tag T in the vicinity of the reference position (corresponding to a perfect alignment between the S-SRR 5 of the reader R and one of the S-SRRs 3 of the tag T). It can be seen that when the tag T is not situated in the reference position, the attenuation at the reference frequency (the notch frequency of the BC-S-SRR) severely decreases.

Figure 5:
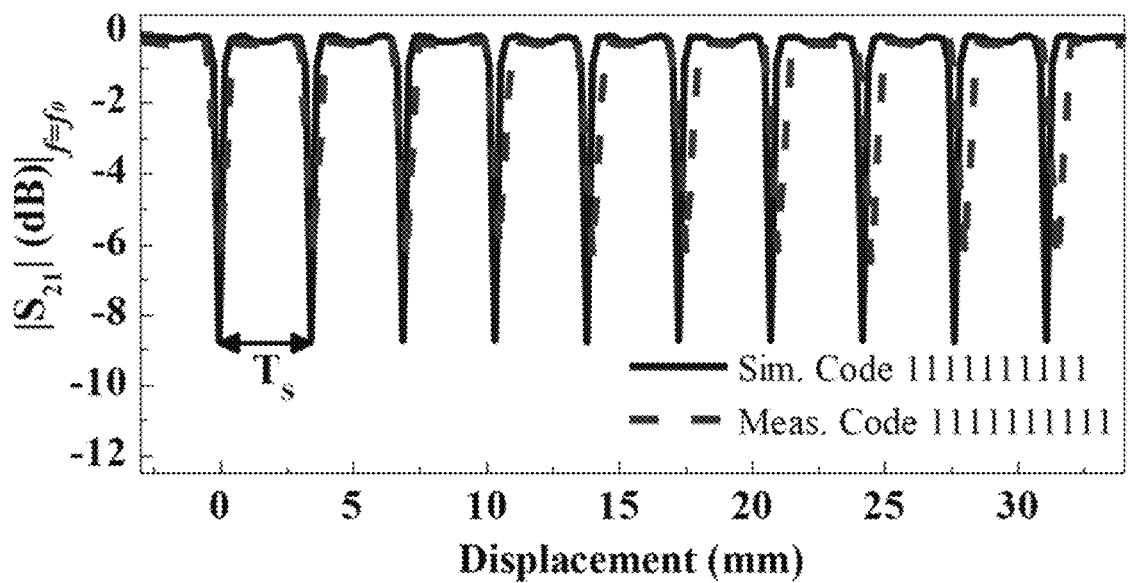
FIG. 5 is a plot showing the attenuation of the tag-CPW at the reference frequency as the tag moves completely (transversally) above the CPW, for the prototypes of FIG. 3.

A complete displacement of the fabricated tag T above the CPW 4 has been carried out, as it is required in a reading operation, and recorded the attenuation at the reference frequency. The result, depicted in FIG. 5, reveals the presence of 10 attenuation peaks, corresponding to the ten S-SRRs 3 of the considered tag T.

Experimental Setup and Tag Reading Operation:

The proof-of-concept of the chipless RFID system of FIG. 1 is implemented as follows. The harmonic signal is generated by means of the Agilent E44338C signal generator, whereas an oscilloscope (Agilent MSO-X-3104A) is used for tag readout. The envelope of the modulated signal at the output of the CPW 4 is extracted by means of an isolator (ATM ATc4-8), used to prevent reflections, and a Schottky diode (Avago HSMS-2860), acting as envelope detector.

Figure 6:
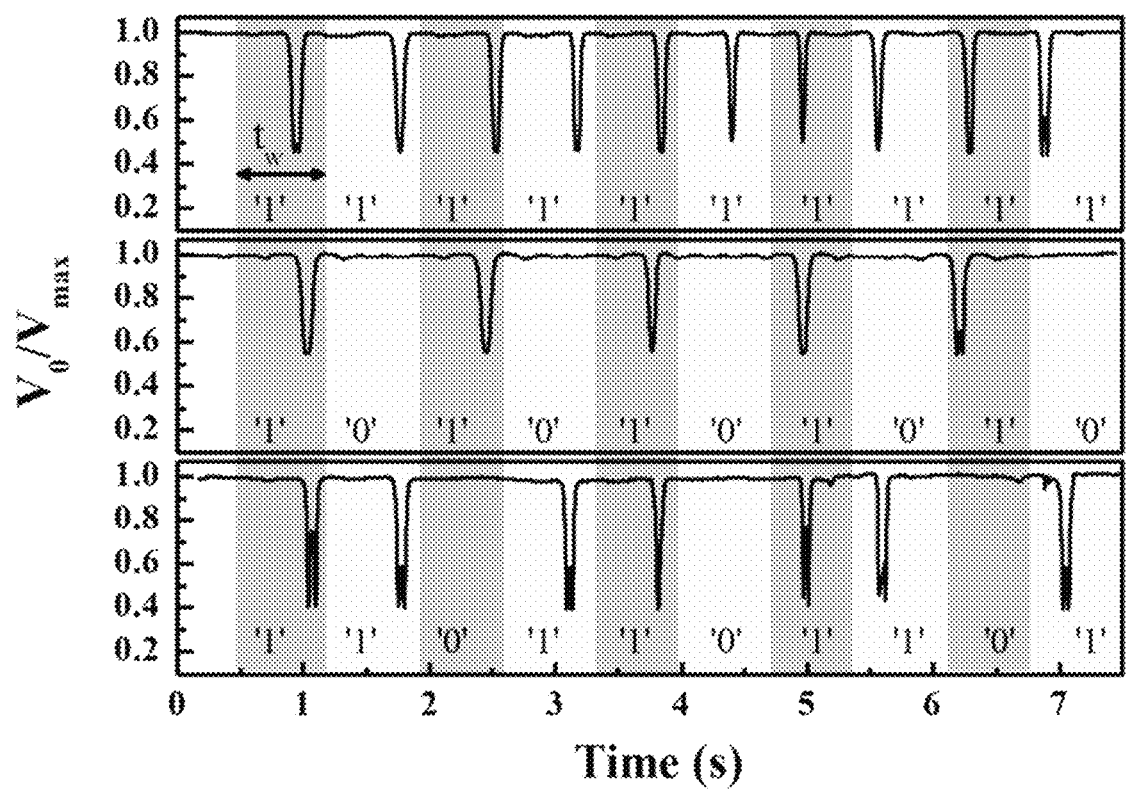
FIG. 6 includes three plots which show measured normalized envelope for 3 fabricated encoders, i.e. chipless RFID tags, with the indicated codes, for the prototype of FIG. 3, i.e. for a "1111111111" code, and for other two prototypes with other codes encoded in the tag, specifically for the following codes: "1010101010" and "1101101101".

With this experimental setup, the ID signatures of three fabricated encoders, i.e. chipless RFID tags T, have been obtained. To this end, the time-varying envelope variation within temporal windows of predefined time ($t_w$) is recorded, providing the ID code, as illustrated in FIG. 6. The minima are not exactly at same positions within the readout windows since the in-house guiding system does not guarantee uniform displacement velocity of the tag T.

For the codes of the two lower plots of FIG. 6, the prototype of the tags T are as that shown in FIG. 3(c) but with the S-SRRs 3 placed at the encoding areas corresponding to the "0" logic states physically altered to become inoperative or with said encoding areas empty of any S-SRR 3.

The obtained results point out the potential of the present invention for achieving chipless RFID encoders with unprecedented data capacity, useful in applications such as authentication or security, where the reading distance can be sacrificed in favor of the number of bits. The number of bits can be significantly increased by simply adding further S-SRRs to the codes. Thus, high data capacity can be achieved without penalizing the complexity of the reader.

A person skilled in the art could introduce changes and modifications in the embodiments described without departing from the scope of the invention as it is defined in the attached claims.

The invention claimed is:

1. A chipless RFID tag, comprising:
   a dielectric substrate;
   electromagnetic resonators excitable by an external electromagnetic field and respectively arranged on separate spatial locations of said dielectric substrate;
   wherein said electromagnetic resonators are arranged on said dielectric substrate forming at least one row, and are configured to resonate at a common resonant frequency, and in that said dielectric substrate defines several predetermined encoding areas that include at least said separate spatial locations, so that data is encoded bitwise as a binary digit for each of the electromagnetic resonators to indicate either the presence or absence of operative electromagnetic resonators at each of said predetermined encoding areas in order for each of said predetermined encoding areas to be read sequentially at discrete time points as bits in a bit string, and
   each of said predetermined encoding areas represents a bit in the bit string.

2. The chipless RFID tag according to claim 1, wherein said common resonant frequency is the fundamental frequency of each of said electromagnetic resonators.

3. The chipless RFID tag according to claim 1, wherein all of said electromagnetic resonators have substantially the same dimensions, geometry, and composition.

4. The chipless RFID tag according to claim 1, wherein said predetermined encoding areas are equidistant to each other, and said at least one row is a linear or circular row running along at least one surface of said dielectric substrate.

5. The chipless RFID tag according to claim 1, wherein said electromagnetic resonators are planar electromagnetic resonators that can be excited by means of said external electromagnetic field.

6. The chipless RFID tag according to claim 5, wherein said planar electromagnetic resonators are split ring resonators having at least one slit, or S-shaped split ring resonators, or spiral resonators, or open-loop resonators, or any planar resonator that can be excited by an external electromagnetic field.

7. The chipless RFID tag according to claim 1, wherein said dielectric substrate is a flexible substrate, including plastic substrates and paper substrates.

8. The method for encoding data on a chipless RFID tag according to claim 1, wherein in the chipless RFID tag the electromagnetic resonators are present in all the encoding areas at equidistant spatial locations, and the method comprises encoding data by physically altering some of said electromagnetic resonators to make them inoperative, said physical alteration being performed by short-circuiting or cutting the electromagnetic resonators, thus providing the logic state '0' to the corresponding so made inoperative electromagnetic resonator.

9. A chipless RFID system, comprising:
   a chipless RFID tag defined according to claim 1; and
   a RFID reader comprising:
      a dielectric support relatively movable with respect to the dielectric substrate of the RFID tag;
      at least one element for at least propagating an electromagnetic wave providing said external electromagnetic field to the electromagnetic resonators, said at least one element being arranged on said dielectric support to move therewith during said relative movement to adjacent locations to said predetermined encoding areas, such that said at least one element is loaded with the electromagnetic resonators of the predetermined encoding areas; and
      detection means configured and arranged for detecting the presence/absence of attenuation peaks on said electromagnetic wave, or on an electrical signal associated thereto, induced by the electromagnetic resonators, and also configured for providing, based on said detections, the data encoded in the RFID tag, in the form of a code having at least one bit per predetermined encoding area, and at least two possible alternate logic states per bit determined by the presence/absence of a respective of said attenuation peaks.

10. The system according to claim 9, wherein the at least one element is arranged on said dielectric support to sequentially move along said adjacent locations during said relative movement, such that the at least one element is sequentially loaded along time with the electromagnetic resonators of the predetermined encoding area adjacent thereto for at least some of the adjacent locations.

11. The system according to claim 10, wherein said RFID reader comprises a guide for guiding the dielectric substrate of the chipless RFID tag with respect to the dielectric support during said sequential relative movement along said adjacent locations, so that for each adjacent position the corresponding encoding area is distanced from the at least one element below a certain distance that guarantees near-field electromagnetic coupling.

12. The system according to claim 9, wherein said at least one element is a transmission line electrically fed through an input port and generating said electrical signal at an output port, and wherein said detection means are connected to said output port of said transmission line for detecting said generated electrical signal and the presence/absence of attenuation peaks thereon.

13. The system according to claim 12, wherein said transmission line is a coplanar waveguide having a central conductor strip and two return conductors, one to either side of the central conductor strip, and separated therefrom by respective slots, wherein said electromagnetic resonators are arranged such that during said relative movement they pass transversally to the transmission line, in a parallel plane, causing attenuation peaks in said electrical signal when any of the electromagnetic resonators, or a portion thereof, is aligned with any of said slots.

14. The system according to claim 9, further comprising at least an additional electromagnetic resonator arranged on a second face of the dielectric support, opposite to a first face on which the at least one element is arranged, configured and arranged for avoiding inter-resonator coupling between the electromagnetic resonators of the dielectric substrate, wherein said additional electromagnetic resonator has substantially the same dimensions, geometry, and composition as each of the electromagnetic resonators arranged on the dielectric substrate but oriented at 180° with respect thereto, and is arranged to be alternatively aligned with each of the electromagnetic resonators of the encoding areas when the at least one element is at the corresponding adjacent location, to provide a broadside-coupled resonators structure formed by the resulting pair of the so aligned electromagnetic resonator and additional electromagnetic resonator, said broadside-coupled resonators structure being associated to a target resonance frequency, and wherein the system comprises a power source configured to generate and feed the at least one element with a harmonic signal tuned at said target resonance frequency.

15. The system according to claim 12, wherein said transmission line is a microstrip line loaded with a resonant element identical to the electromagnetic resonators of the chipless RFID tag, and configured as a bandpass structure, so that each time the electromagnetic resonators of the chipless RFID tag cross the microstrip line, detuning in the response is achieved, resulting in attenuation peaks in an electrical harmonic signal used to feed the microstrip line.

* * * * *